United States Patent
Hudson et al.

(10) Patent No.: US 11,151,555 B2
(45) Date of Patent: Oct. 19, 2021

(54) CODE-BASED OR TOKEN-BASED TRANSFERS USING AUTOMATED TELLER MACHINES

(71) Applicant: INTERNATIONAL BUSINESS MACHINES CORPORATION, Armonk, NY (US)

(72) Inventors: Michael J. Hudson, Delray Beach, FL (US); Lisa Seacat Deluca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 16/022,010

(22) Filed: Jun. 28, 2018

(65) Prior Publication Data
US 2020/0005289 A1 Jan. 2, 2020

(51) Int. Cl.
G06Q 30/00 (2012.01)
G06Q 20/38 (2012.01)
G06Q 20/32 (2012.01)
G06Q 20/10 (2012.01)

(52) U.S. Cl.
CPC ....... *G06Q 20/385* (2013.01); *G06Q 20/1085* (2013.01); *G06Q 20/3224* (2013.01)

(58) Field of Classification Search
CPC .................................................. G06Q 20/38
USPC ............ 705/43, 1.1, 40, 39, 41, 42; 235/379
See application file for complete search history.

(56) References Cited

U.S. PATENT DOCUMENTS

| 8,073,770 | B2* | 12/2011 | Cole ............... G06Q 40/04 705/39 |
| 9,659,294 | B2 | 5/2017 | Laracey |
| 9,721,248 | B2* | 8/2017 | Bondesen ....... G06Q 20/36 |
| 2015/0073984 | A1 | 3/2015 | Andrews et al. |
| 2018/0005206 | A1* | 1/2018 | Belin ............. G07F 19/203 |

FOREIGN PATENT DOCUMENTS

| WO | 2014130222 | 8/2014 |
| WO | 2016100965 | 6/2016 |

OTHER PUBLICATIONS

ProQuestDialogNPL Search History.*
Brostoff et al., "Evaluating the usability and security of a graphical one-time PIN system", Proceedings of the 24th BCS Interaction Specialist Group Conference, 2010, 8 pages.
Anonymous, "Wells Fargo: All ATMs will take phone codes, not just cards", https://www.azcentral.com/story/money/business/consumers/2017/03/29/wells-fargo-atms-no-cards-smartphone-app-scl/99783104/, Associated Press, Mar. 29, 2017, 2 pages.

* cited by examiner

Primary Examiner — John H. Holly
(74) Attorney, Agent, or Firm — Diana Roberts Gerhardt; Andrew D. Wright; Roberts Calderon Safran & Cole, P.C.

(57) ABSTRACT

Methods and systems for code-based or token-based transfers using automated teller machines are disclosed. A method includes: receiving, by a first computing device, a request from a first user; and generating a code corresponding to the request, wherein the code corresponding to the request is usable by a second user at a second computing device that is configured to fulfill the request in response to receiving the code from the second user, and the second computing device is an automated teller machine (ATM).

20 Claims, 5 Drawing Sheets

CODE-BASED OR TOKEN-BASED TRANSFERS USING AUTOMATED TELLER MACHINES

BACKGROUND

The present invention generally relates to computing devices and, more particularly, to methods and systems for code-based or token-based transfers using automated teller machines.

Person-to-person immediate payments are an emerging part of the payments landscape. Financial technology (FinTech) companies offer the ability for members to transfer funds between accounts or wallets within their networks, in real time and outside of traditional banking systems. Banks have responded by building person-to-person features into their mobile apps which allow customers to send money to other people either within the bank or within a network of participating banks, bypassing the need for payment systems. Other systems provide for person-to-person immediate payments using credit card networks. Cryptocurrency enables the transfer of funds between wallets, outside of the traditional banking network.

SUMMARY

In a first aspect of the invention, there is a method that includes: receiving, by a first computing device, a request from a first user; and generating a code corresponding to the request, wherein the code corresponding to the request is usable by a second user at a second computing device that is configured to fulfill the request in response to receiving the code from the second user, and the second computing device is an automated teller machine (ATM).

In another aspect of the invention, there is a computer program product that includes a computer readable storage medium having program instructions embodied therewith. The program instructions are executable by a computing device to cause the computing device to: receive a request from a first user for a cash transfer from the first user to the second user using a first automated teller machine (ATM) in an ATM network; generate a code corresponding to the request; receive the code from the second user; and fulfill the request using a second ATM in the ATM network in response to receiving the code from the second user.

In another aspect of the invention, there is a system that includes: a hardware processor, a computer readable memory, and a computer readable storage medium associated with a computing device; program instructions configured to receive a first request from a first user; program instructions configured to generate a first digital token corresponding to the first request; program instructions configured to receive a second digital token from a second user; and program instructions configured to fulfill a second request to which the second digital token corresponds in response to receiving the second digital token from the second user and validating the received second digital token, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
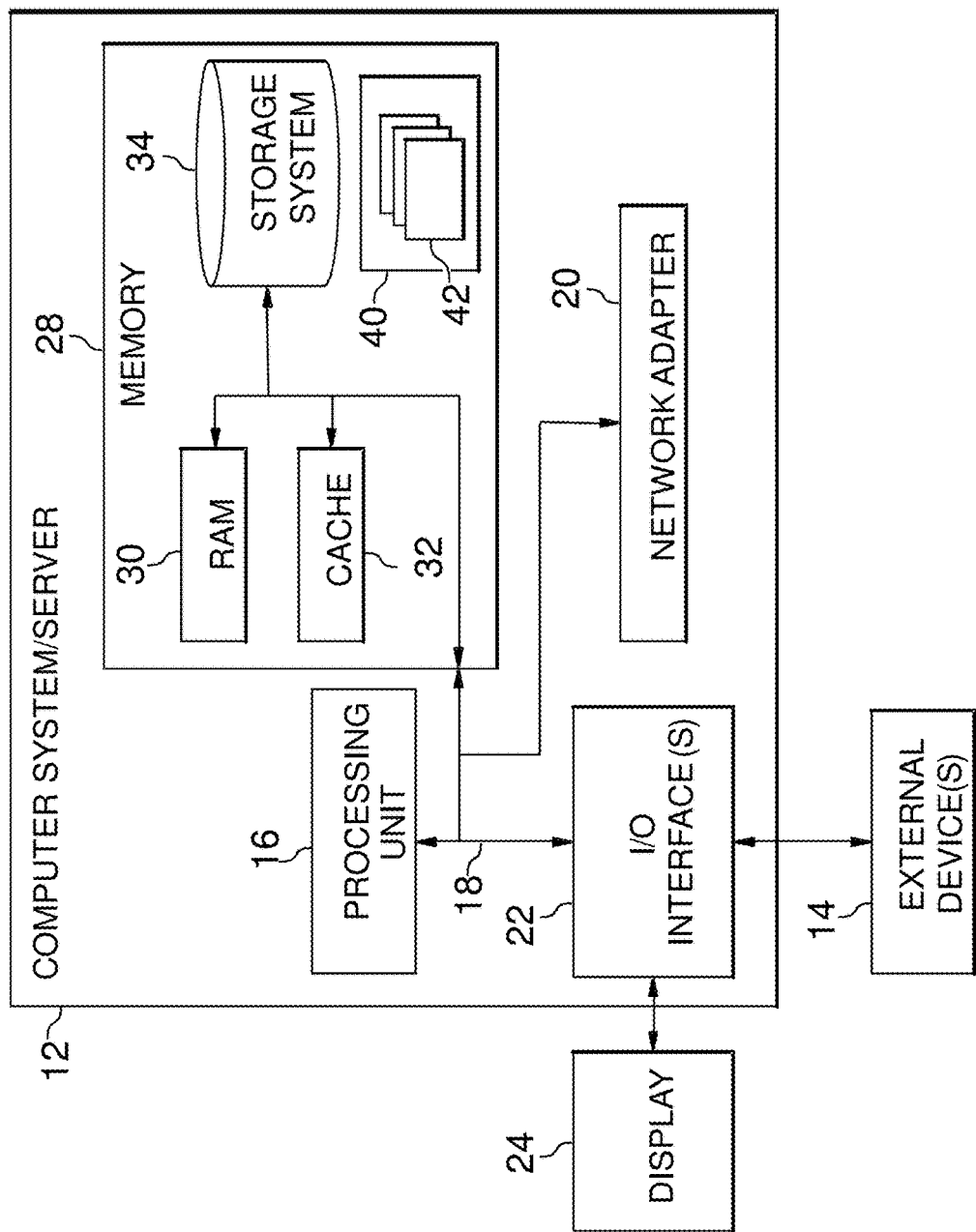
FIG. 1 depicts a computer system in accordance with aspects of the invention.

The present invention generally relates to computing devices and, more particularly, to methods and systems for code-based or token-based transfers using automated teller machines (ATMs). As described herein, aspects of the invention include a method and system for sending money to a recipient without requiring the recipient to have or use a bank account or digital wallet. Embodiments provide a method and system for person-to-person cash payments using ATMs. The method and system provides for withdrawal of a predefined amount of cash from a sender's bank account by a recipient by providing a code or token at an ATM.

Conventional methods for transferring money to a party that does not have a bank account include sending cash. However, various shortcomings are associated with sending cash. First, the sender needs to have physical currency (e.g., cash such as bills and/or coins) available. Second, the sender needs a way to give the physical currency to the recipient, and therefore both the sender and the recipient must be in physical proximity to one another or the sender must use a reliable shipping mechanism. Third, no reliable record is generated providing proof that the cash transaction was completed. Despite these shortcomings, a significant portion of the population is more comfortable sending cash as opposed to using conventional digital money transfer mechanisms.

Embodiments of the invention address the above-mentioned shortcomings associated with conventional methods of sending cash. As described herein, aspects of the invention include a method and system for person-to-person cash payments using ATMs by receiving from a sender at an ATM a request to initiate a person-to-person money transfer to a recipient and an amount of cash to transfer to the recipient, providing a code or digital token usable by the recipient at another ATM, and dispensing from another ATM (i.e., the ATM at which the recipient provided the code or digital token) the specified amount of cash in response to the recipient providing the code or digital token at the ATM.

Embodiments improve the functioning of a computer (e.g., an ATM) by providing improved software and/or hardware that implements systems and methods for person-to-person cash transfers. In particular, embodiments improve software and/or hardware of mobile banking servers, mobile banking applications, short message service banking servers, web banking application servers, and/or web banking applications to provide systems and methods for person-to-person cash transfers that avoid the requirement for the sender to have physical currency available and avoid the requirement for the recipient to have a bank account or digital wallet. Additionally, embodiments improve the aforementioned software and/or hardware to provide a mechanism for a sender to give physical currency to a recipient regardless of the physical proximity (or lack thereof) of the sender and recipient. Furthermore, embodiments improve the aforementioned software and/or hardware to provide for the generating of a record providing proof that a cash transaction was completed. Additionally, the system uses devices that are, by definition, rooted in computer technology (e.g., ATMs, mobile banking servers, mobile banking applications, short message service banking servers, web banking application servers, and/or web banking applications) that cannot be performed manually by a person. For example, an ATM is a particular machine that includes specialized hardware (including a CPU, a card reader, a PIN pad, a receipt printer, a currency vault, a currency dispenser, and/or other specialized components) as well as specialized software that enables the functionality of the specialized hardware components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
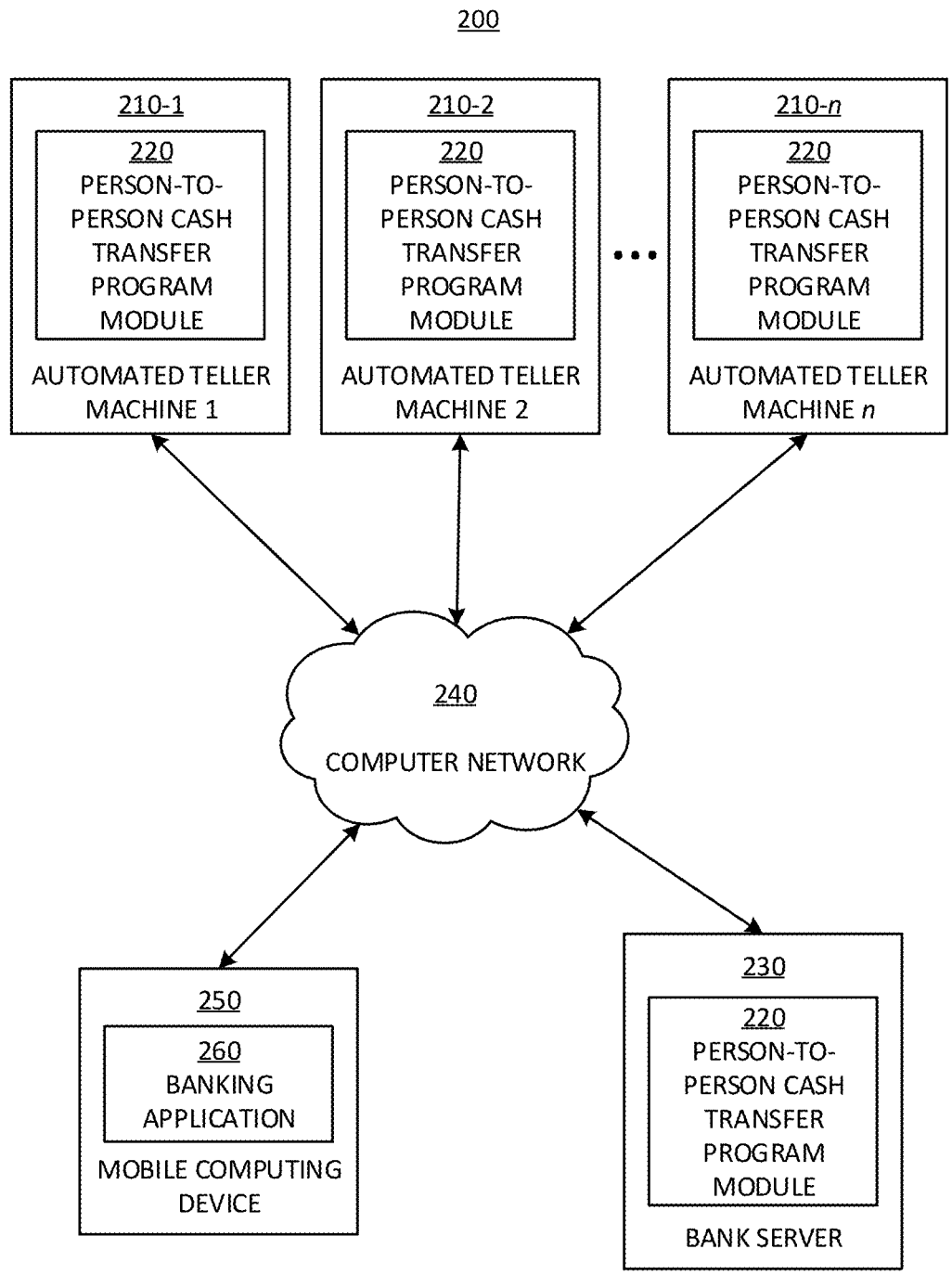
FIG. 2 depicts an illustrative environment in accordance with aspects of the invention.

FIG. 2 depicts an illustrative environment 200 in accordance with aspects of the invention. As shown, the environment 200 comprises ATMs 210-1, 210-2, . . . , 210-n, a bank server 230, and a mobile computing device 250 which are in communication via a computer network 240. The computer network 240 may be any suitable network including any combination of a LAN, WAN, or the Internet. The ATMs 210-1, 210-2, . . . , 210-n, the bank server 230, and the mobile computing device 250 may be physically collocated, or, more typically, may be situated in separate physical locations. Each of the ATMs 210-1, 210-2, . . . , 210-n may be included in a network of plural ATMs (i.e., an ATM network) that is controlled and/or owned by a single entity, such as a bank.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, each of the ATMs 210-1, 210-2, . . . , 210-*n* may be a specialized machine that includes a card reader, a PIN pad, a receipt printer, a currency vault, and a currency dispenser, as well as one or more components of the computer system (or server) 12 as shown in FIG. 1. Each of the ATMs 210-1, 210-2, . . . , 210-*n* may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the ATMs 210-1, 210-2, . . . , 210-*n* may include a person-to-person cash transfer program module 220, which may include hardware and/or software and may be one or more of the program modules 42 shown in FIG. 1. According to an embodiment, the person-to-person cash transfer program module 220 includes program instructions for providing person-to-person cash payments using one or more of the ATMs 210-1, 210-2, . . . , 210-*n*. The program instructions included in the person-to-person cash transfer program module 220 of each of the ATMs 210-1, 210-2, . . . , 210-*n* may be executed by one or more hardware processors.

Still referring to FIG. 2, in embodiments, the bank server 230 may be a computer system (or server) 12 as shown in FIG. 1. The bank server 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. The bank server 230 may communicate with the ATMs 210-1, 210-2, . . . , 210-*n* and provide functionality including transaction processing.

In embodiments, the bank server 230 may include the person-to-person cash transfer program module 220, which may include hardware and/or software and may be one or more of the program modules 42 shown in FIG. 1. The program instructions included in the person-to-person cash transfer program module 220 of the bank server 230 may be executed by one or more hardware processors.

In embodiments, the mobile computing device 250 may be a device such as a cellular phone, tablet, PDA, laptop computer, or any other type of mobile computing device. The mobile computing device 250 may include one or more components of the computer system (or server) 12 as shown in FIG. 1. The mobile computing device 250 may include banking application 260, which may include hardware and/or software and may be one or more of the program modules 42 shown in FIG. 1. The program instructions included in the person-to-person cash transfer program module 220 of the bank server 230 may be executed by one or more hardware processors.

Figure 3:
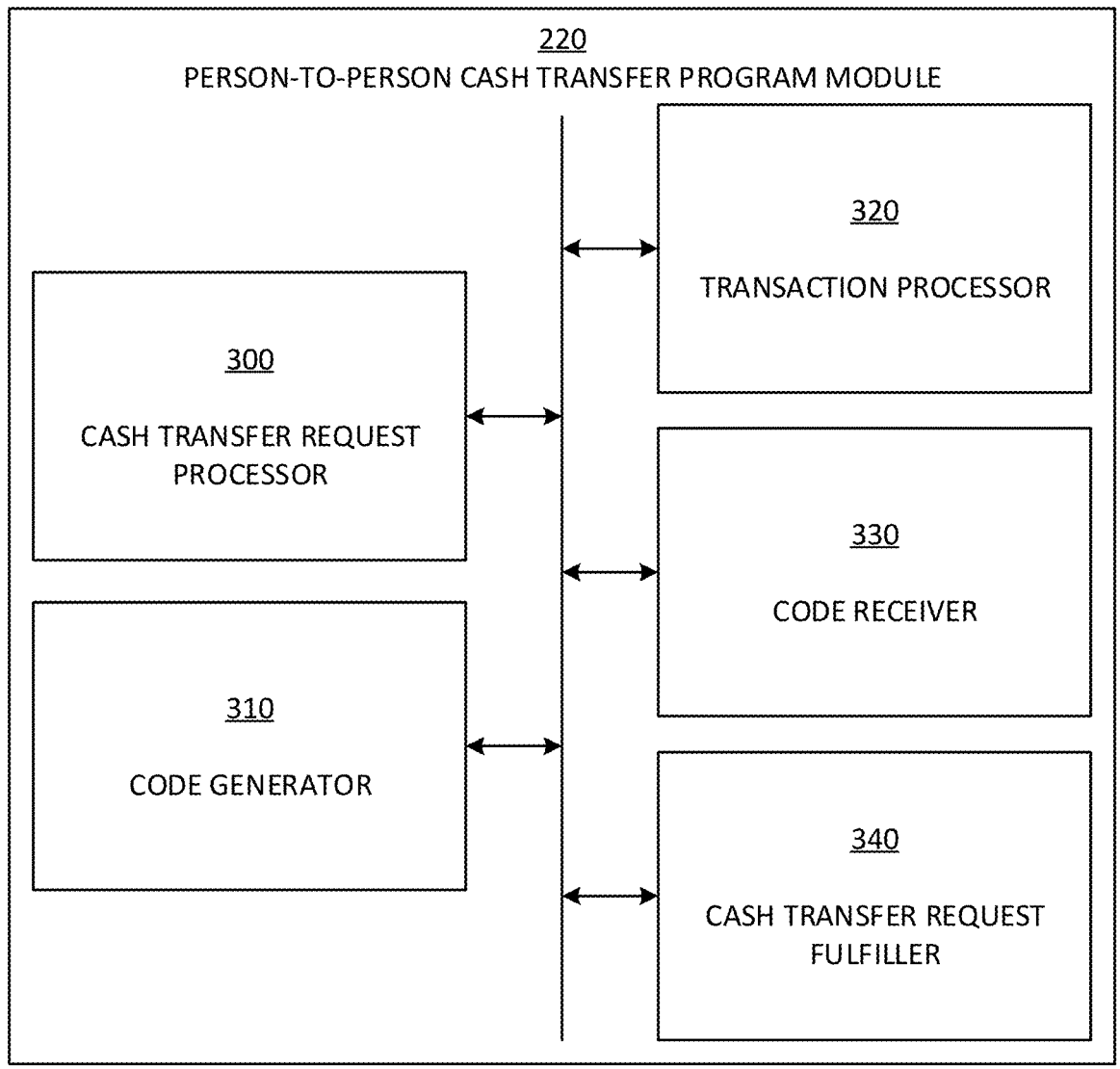
FIG. 3 depicts a block diagram of an exemplary program module in accordance with aspects of the invention.

FIG. 3 depicts a block diagram of an exemplary person-to-person cash transfer program module 220 in each of the ATMs 210-1, 210-2, . . . , 210-*n* (of FIG. 2) in accordance with aspects of the invention. In embodiments, the person-to-person cash transfer program module 220 includes a cash transfer request receiver 300, a code generator 310, a transaction processor 320, a code receiver 330, and a cash transfer request fulfiller 340, each of which may comprise one or more program modules 42 as described with respect to FIG. 1. In embodiments, the person-to-person cash transfer program module 220 may include additional or fewer components than those shown in FIG. 3. In embodiments, separate components may be integrated into a single computing component or module. Additionally, or alternatively, a single component may be implemented as multiple computing components or modules. According to another embodiment, the functions of one or more of the cash transfer request receiver 300, the code generator 310, the transaction processor 320, the code receiver 330, and the cash transfer request fulfiller 340 may be provided as services in a distributed computing environment.

According to other embodiments, the person-to-person cash transfer program module 220 may be a program module in a mobile banking server with which a mobile banking application interfaces, a short message service (SMS) banking server with which a user interacts via SMS messages, a web banking application server with which a web banking application interfaces. In these embodiments, a user accessing a mobile banking application, an SMS banking application, or a web banking application, for example, the banking application 260 on the mobile computing device 250, may interact with the person-to-person cash transfer program module 220 of the bank server 230 to initiate a person-to-person cash transfer using via the mobile banking application, the SMS banking application, or the web banking application.

In embodiments, the cash transfer request receiver 300 receives a request from a user of one of the ATMs 210-1, 210-2, . . . , 210-*n* (or, according to alternate embodiments, from a user of a mobile banking application, an SMS banking application, or a web banking application) to initiate a person-to-person cash transfer. In embodiments, the ATMs 210-1, 210-2, . . . , 210-*n* may present a graphical user interface (GUI) that is usable by a user to select an option to initiate a person-to-person cash transfer and specify parameters (options) associated with the transfer.

For example, the GUI may display text and/or graphics representing a person-to-person cash transfer send function, and the user may use buttons and/or a touchscreen associated with one of the ATMs 210-1, 210-2, . . . , 210-*n* to select the person-to-person cash transfer send function. This selection of the text and/or graphics representing the person-to-person cash transfer function may be interpreted by the ATMs 210-1, 210-2, . . . , 210-*n* as a request to initiate a person-to-person cash transfer function, and such request may be received by the cash transfer request receiver 300.

The cash transfer request receiver 300 may receive the request from the user while the user is in a logged-in or otherwise authenticated state with respect to the ATM 210-1, 210-2, . . . , or 210-*n* that received the request from the user. For example, the user may have inserted, dipped, or swiped an ATM card in a card reader of one of the ATMs 210-1, 210-2, . . . , 210-*n* or may have used a code, token, or other authentication mechanism to authenticate with one of the ATMs 210-1, 210-2, . . . , 210-*n*.

The cash transfer request receiver 300 may receive information from the user that specifies or is associated with an intended recipient of the cash transfer. In embodiments, the cash transfer request receiver 300 may receive a mobile phone number or an email address associated with the intended recipient of the cash transfer. The cash transfer request receiver 300 may present to the user one or more previously used mobile phone numbers, email addresses, and/or names associated therewith in order to simplify the process of specifying the intended recipient of the cash transfer. Certain verification processes may also be provided, such as displaying the specified phone number or email address for confirmation by the user, requesting the specified phone number or email address to be input multiple times for confirmation, and/or requesting additional verification from the user when a new phone number or email address is specified.

The cash transfer request receiver 300 may also receive from the user information about an amount of cash to transfer to the recipient. In embodiments, the cash transfer request receiver 300 may receive from the user a selection of cash as a delivery mechanism and information about a fixed amount of cash to be transferred to the recipient. Alternatively, the cash transfer request receiver 300 may receive a maximum amount of cash to be transferred to the recipient, a range of allowable amounts of cash to be transferred to the recipient, or a plurality of predetermined amounts of cash that may be transferred to the recipient.

Optionally, the cash transfer request receiver 300 receive from the user a selection indicating whether any ATM fees (e.g., fees associated with one of the ATMs 210-1, 210-2, . . . , 210-n used by a recipient to receive the cash transfer) are to be charged to the user or to the recipient (e.g., by deducting such fees from the amount of cash transferred to the recipient). Additionally, the cash transfer request receiver 300 may optionally receive from the user a selection of an account to be debited for the amount of cash to be transferred to the recipient and optionally any fees associated with the cash transfer, including fees associated with one of the ATMs 210-1, 210-2, . . . , 210-n used by the recipient if the user elected to have such fees charged to his or her account. For example, the cash transfer request receiver 300 may present a list of accounts associated with the logged-in or authenticated user and receive a selection of an account from the list of accounts to be used for the cash transfer.

Optionally, the cash transfer request receiver 300 may also receive from the user a request to restrict fulfillment of the cash transfer request to one of the ATMs 210-1, 210-2, . . . , 210-n that is at a predetermined location specified by the user. For example, if the user knows that the recipient only uses one of the ATMs 210-1, 210-2, . . . , 210-n that is at the predetermined location, such a request to restrict fulfillment to one of the ATMs 210-1, 210-2, . . . , 210-n that is at the predetermined location provides for enhanced security.

Still referring to FIG. 3, in embodiments, in response to the cash transfer request receiver 300 receiving from the user the request to transfer cash to the recipient, the code generator 310 generates a code usable by the recipient to retrieve, at one of the ATMs 210-1, 210-2, . . . , 210-n, the cash to be transferred by the user as specified in the request. This code may be a numeric code, alphanumeric code, barcode, quick response (QR) code, or any other type of code. Alternatively, the code may be a digital token. According to another embodiment, the functions of the code generator 310 may be provided as a service in a distributed computing environment.

The code generator 310 may cause the generated code or digital token to be sent to a computer device of the recipient (e.g., a mobile computing device 250 of FIG. 2 belonging to the recipient) using SMS, email, Bluetooth, or near-field communication (NFC) protocols, or using any other electronic mechanism. Alternatively, the code generator 310 may provide the code or digital token to a computer device of the user who initiated the cash transfer request (e.g., a mobile computing device 250 of FIG. 2 belonging to the user who initiated the cash transfer request) (e.g., by SMS, email, Bluetooth, NFC protocols, or any other electronic mechanism), and the user may then provide the code or digital token to the recipient via a mechanism such as SMS, email, Bluetooth, NFC protocols, or any other electronic mechanism. In yet another embodiment, the code generator 310 may provide the code to the user who initiated the cash transfer request by causing the generated code to be printed out (e.g., by a receipt printer) or displayed on a display.

Still referring to FIG. 3, in embodiments, the transaction processor 320 receives information about the requested cash transfer from the cash transfer request receiver 300 as well as the code or digital token generated by the code generator 310 (or an encrypted and/or hashed version of the code or digital token). The information received by the transaction processor 320 may include information identifying the user sending the cash transfer, information identifying the recipient of the cash transfer, information about the amount of the cash transfer, and any other information received by the cash transfer request receiver 300 from the user or otherwise obtained by the cash transfer request receiver 300 that relates to the requested cash transfer. The transaction processor 320 may perform transaction processing including validating the requested cash transfer by transmitting the information received from the cash transfer request receiver 300 to the bank server 230 for entry into a transaction record corresponding to the cash transfer request.

Still referring to FIG. 3, in embodiments, the code receiver 330 may receive from the recipient the code or digital token generated by the code generator 310. In embodiments, the GUI presented by the ATMs 210-1, 210-2, . . . , 210-n may be usable by the recipient to select an option to receive a person-to-person cash transfer. For example, the GUI may display text and/or graphics representing a person-to-person cash transfer receive function, and the user may use buttons and/or a touchscreen associated with one of the ATMs 210-1, 210-2, . . . , 210-n to select the person-to-person cash transfer receive function. This selection of the text and/or graphics representing the person-to-person cash transfer receive function may be interpreted by the ATMs 210-1, 210-2, . . . , 210-n as a request to receive a person-to-person cash transfer function, and in response, the code receiver 330 may present an interface usable by the recipient to input the code generated by the code generator 310. The interface may be a physical or on-screen keyboard or keypad interface that accepts input of codes. Alternatively, the interface may be a camera or scanner configured to capture and read the recipient's code (e.g., by scanning or capturing a photo of a device screen displaying the code or of a printout of the code). In other embodiments, Bluetooth or near-field communication (NFC) protocols may be used to transmit the code or digital token to the code receiver 330.

Still referring to FIG. 3, in response to the code receiver 330 receiving the code or digital token from the recipient, the cash transfer request fulfiller 340 attempts to fulfill the cash transfer request. In particular, the cash transfer request fulfiller 340 communicates with the transaction processor 320 to validate or authenticate the code or digital token received by the code receiver 330. More specifically, the transaction processor 320 determines whether or not the code or digital token received by the code receiver 330 corresponds to a valid cash transfer request.

For example, the transaction processor 320 may communicate with the bank server 230 to determine (1) whether or not the received code or digital token corresponds to a cash transfer request, (2) whether or not the cash transfer request has already been fulfilled (i.e., the cash has already been provided to the recipient), (3) whether or not the sending user's account has sufficient funds to process the cash transfer request (e.g., an account selected by the sending user at the time the sending user initiates the cash transfer request), (4) an amount of cash to transfer, and/or (5) any parameters (options) associated with the cash transfer request (e.g., whether to charge any fee associated with one of the ATMs 210-1, 210-2, . . . , 210-n used by the recipient to the sending user or to the recipient or a request to restrict fulfillment to one of the ATMs 210-1, 210-2, . . . , 210-n that is at the predetermined location).

According to another embodiment, the transaction processor 320 may determine a distance between the one of the ATMs 210-1, 210-2, . . . , 210-n used by the recipient and a computing device such as a mobile computing device associated with the recipient (e.g., mobile computing device 250). In response to the determined distance exceeding a predetermined threshold, the transaction processor 320 may invalidate the code and prevent any cash from being dispensed. In another embodiment, the transaction processor 320 may invalidate the code and prevent any cash from being dispensed if the transaction processor 320 determines that the one of the ATMs 210-1, 210-2, . . . , 210-n used by the recipient is not one of the ATMs 210-1, 210-2, . . . , 210-n that is at the predetermined location.

In response to the transaction processor 320 determining that the cash transfer request is a valid cash transfer, the cash transfer request fulfiller 340 causes the one of the ATMs 210-1, 210-2, . . . , 210-n being used by the recipient to dispense the amount of cash specified by the sending user when the cash transfer request was initiated, and the transaction processor 320 communicates with the bank server 230 to update a transaction record corresponding to the cash transfer request to indicate that the request was fulfilled (and optionally information including a location or particular ATM where the request was fulfilled and a time when the request was fulfilled), such that subsequent attempts to obtain cash using the code or digital token will be deemed invalid and rejected by the transaction processor 320.

If the one of the ATMs 210-1, 210-2, . . . , 210-n being used by the recipient is not affiliated or associated with the sending user's bank, an ATM fee may be charged to the sending user's account or subtracted from the proceeds being dispensed to the recipient, based upon a predetermined policy specified by the sending user's bank and/or an option selected by the sending user when the cash transfer request was initiated. According to an embodiment, this fee may be avoided by using an ATM affiliated or associated with the sending user's bank.

Alternatively, if the sending user specified a maximum amount of cash to be transferred to the recipient, a range of allowable amounts of cash to be transferred to the recipient, or a plurality of predetermined amounts of cash that may be transferred to the recipient, the cash transfer request fulfiller 340 may receive from the recipient a specified amount of cash, and provided that the transaction processor 320 determines that the specification amount of cash is valid (i.e., permitted based upon the selection options or parameters) with respect to the cash transfer request, the cash transfer request fulfiller causes the one of the ATMs 210-1, 210-2, . . . , 210-n being used by the recipient to dispense the amount of cash specified by the recipient and update the transaction record corresponding to the cash transfer request to indicate that the request was fulfilled such that subsequent attempts to obtain cash using the code or digital token will be deemed invalid and rejected by the transaction processor 320.

Optionally, the cash transfer request fulfiller 340 may, after causing the one of the ATMs 210-1, 210-2, . . . , 210-n being used by the recipient to dispense the cash, send an alert to the sending user indicating that the funds were withdrawn by the recipient and deducted from the sending user's account and/or send an alert to the recipient indicating that the funds were transferred via cash. These alerts may be SMS messages, email messages, and/or mobile app notifications, or may take any other form. Other records logging the request and fulfillment thereof may be generated and made available to the sending user and/or the recipient.

Figure 4:
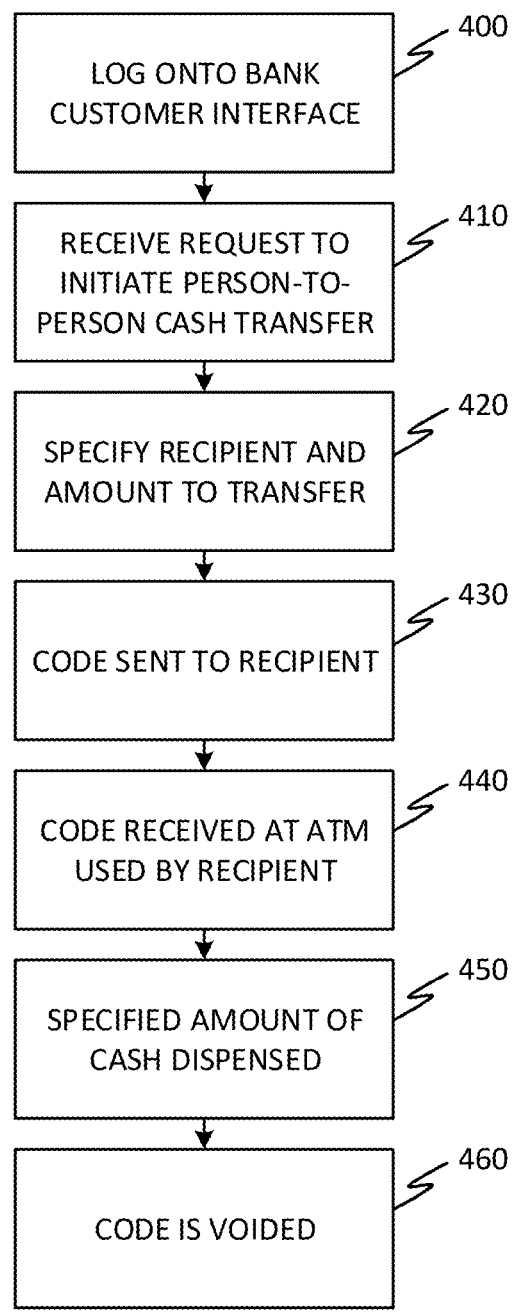
FIG. 4 depicts a flowchart of an exemplary method in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 1, 2, and 3.

At step 400, a user logs onto a bank's customer interface. In embodiments, as described with respect to FIG. 3, step 400 comprises a user logging into or otherwise authenticating with one of the ATMs 210-1, 210-2, . . . , 210-n, a mobile banking server with which a mobile banking application interfaces, a short message service (SMS) banking server with which a user interacts via SMS messages, or a web banking application server with which a web banking application interfaces.

At step 410, the system receives a request to initiate a person-to-person cash transfer. In embodiments, as described with respect to FIG. 3, step 410 comprises the cash transfer request receiver 300 receiving a request from the user to initiate a person-to-person cash transfer, for example, through a GUI of one of the ATMs 210-1, 210-2, . . . , 210-n.

At step 420, the system receives information specifying a recipient and an amount to transfer. In embodiments, as described with respect to FIG. 3, step 420 comprises the cash transfer request receiver 300 receiving a mobile phone number or an email address associated with the intended recipient of the cash transfer as well as an amount of cash to transfer to the recipient. Step 420 also comprises the transaction processor 320 receiving the information about the recipient and the amount to transfer and transmitting the information to the bank server 230.

At step 430, the system sends a code to a computer device of the recipient. In embodiments, as described with respect to FIG. 3, step 430 comprises the code generator 310 generating a code usable by the recipient to retrieve, at one of the ATMs 210-1, 210-2, . . . , 210-n, the cash to be transferred by the user as specified in the request. Step 430 also comprises the transaction processor 320 receiving the code from the code generator 310 and transmitting the information to the bank server 230.

At step 440, the system receives the code at an ATM used by the recipient. In embodiments, as described with respect to FIG. 3, step 440 comprises the code receiver 330 receiving from the recipient the code or digital token generated by the code generator 310 and transmitting the code or digital token to the cash transfer request fulfiller 340.

At step 450, in response to determining that the code or digital token corresponds to a valid cash transfer request, the system causes the one of the ATMs 210-1, 210-2, . . . , 210-n used by the recipient to dispense the specified amount of cash. In embodiments, as described with respect to FIG. 3, step 450 comprises the cash transfer request fulfiller 340 communicating with the transaction processor 320 to determine whether or not the code or digital token corresponds to a valid cash transfer request, and in response to determining that the code or digital token corresponds to a valid cash transfer request, causing the one of the ATMs 210-1, 210-2, . . . , 210-*n* used by the recipient to dispense the specified amount of cash.

At step 460, the system voids the code so that it may not be used again. In embodiments, as described with respect to FIG. 3, step 460 comprises the transaction processor 320 communicating with the bank server 230 to update a transaction record corresponding to the cash transfer request to indicate that the request was fulfilled, such that subsequent attempts to obtain cash using the code or digital token will be deemed invalid and rejected by the transaction processor 320.

Figure 5:
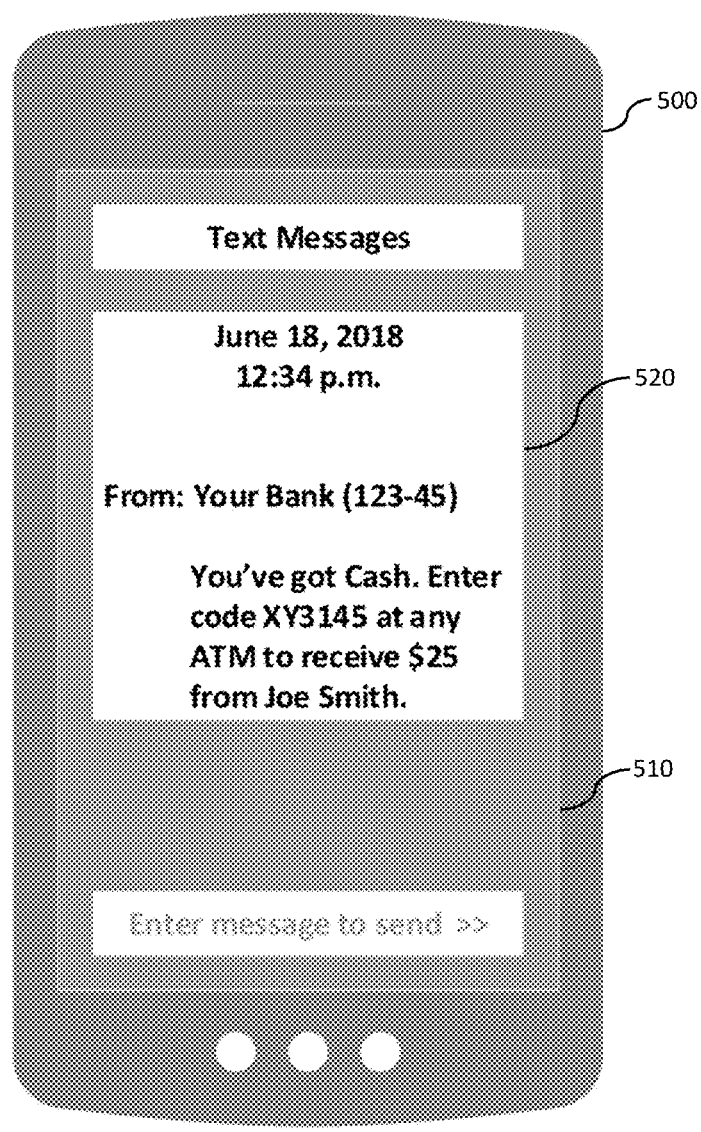
FIG. 5 depicts an illustrative example of a text message, received at a recipient's mobile device, that includes a generated code usable by the recipient to retrieve cash at an automated teller machine in accordance with aspects of the invention.

FIG. 5 depicts an illustrative example of a text message, received at a recipient's mobile device, that includes a generated code usable by the recipient to retrieve cash at an automated teller machine in accordance with aspects of the invention. In embodiments, the code generator 310 of FIG. 3 may cause the generated code to be sent to a mobile device 500 of the recipient as a text message (e.g., using SMS). The mobile device 500 may be the mobile computing device 250 of FIG. 2.

In response to the code generator 310 of FIG. 3 causing the generated code to be sent to the mobile device 500 as a text message, the mobile device 500 may display text message 520 on a display 510 of the mobile device 500. The text message 520 may include the generated code (e.g., "XY3145" in the illustrative example of FIG. 5) as a notification that a user (e.g., "Joe Smith") has sent a particular amount of cash (e.g., "$25") to the recipient (e.g., the person to whom the mobile device 500 belongs).

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  receiving, by a computing device, a request to authorize a disbursement of funds, the request being received from a first user;
  generating, by the computing device, a code corresponding to the request and a hashed version of the code;
  transmitting, by the computing device and to a second user, a range of amounts from which the second user can select an amount of the disbursement of funds;
  transmitting, by the computing device and to an automated teller machine (ATM), an electronic authorization to disburse the funds from the ATM, the authorization including the hashed version of the code; and
  instructing, by the computing device, the ATM to disburse the funds upon receipt of the code from the second user,
  wherein the code corresponding to the request is usable by the second user at the ATM, and
  the ATM is configured to fulfill the request by disbursing the funds in response to receiving the code from the second user.

2. The method according to claim 1, wherein the computing device is the ATM or another ATM.

3. The method according to claim 2, wherein the request is for a cash transfer from the first user to the second user.

4. The method according to claim 1, wherein the fulfilling the request comprises invaliding the code such that the request cannot be fulfilled more than one time.

5. The method according to claim 1, wherein the ATM is at a predetermined location, and
  the generated code is only valid at the ATM at the predetermined location.

6. The method according to claim 1, wherein the fulfilling the request in response to receiving the code from the second user comprises:
  determining a distance between the ATM and a third computing device associated with the second user;
  in response to the determined distance exceeding a predetermined threshold, the ATM invaliding the code and preventing any cash associated with the request from being dispensed; and
  in response to the determined distance not exceeding the predetermined threshold, the ATM causing a predetermined amount of cash to be dispensed.

7. A computer program product comprising a computer readable storage medium having program instructions embodied therewith, the program instructions executable by a computing device to cause the computing device to:
  receive a request from a first user for a cash transfer from the first user to a second user using a first automated teller machine (ATM) in an ATM network;
  generate a code corresponding to the request;
  transmit to the second user a range of amounts from which the second user can select an amount of the cash transfer;
  transmit to a second ATM in the ATM network an electronic authorization to disburse funds of the cash transfer from the second ATM, the authorization including the code;
  instruct the second ATM to disburse the funds upon receipt of the code from the second user;
  receive the code from the second user; and fulfill the request using the second ATM in the ATM network in response to receiving the code from the second user.

8. The computer program product according to claim 7, wherein the fulfilling the request comprises the second ATM in the ATM network causing a predetermined amount of cash to be dispensed in response to validating the received code.

9. The computer program product according to claim 8, wherein the predetermined amount is reduced by a transaction fee.

10. The computer program product according to claim 8, wherein the fulfilling the request comprises invaliding the code such that the request cannot be fulfilled more than one time.

11. The computer program product according to claim 8, the program instructions further being executable by the computing device to cause the computing device to send an alert to the first user indicating that the predetermined amount of cash was dispensed by the second ATM in the ATM network.

12. The computer program product according to claim 8, the program instructions further being executable by the computing device to cause the computing device to send an alert to the second user indicating that the predetermined amount of cash was transferred.

13. A system comprising:
a hardware processor, a computer readable memory, and a computer readable storage medium associated with a computing device;
program instructions configured to receive a request to authorize a disbursement of funds from an automated teller machine (ATM), the request being received from a first user;
program instructions configured to generate a first code corresponding to the request;
program instructions to transmit to a second user, a range of amounts from which the second user can select an amount of the disbursement of funds;
program instructions configured to transmit to the ATM, an electronic authorization to disburse the funds from the ATM, the authorization including the first code;
program instructions configured to receive a second code from the ATM;
program instructions configured to compare the second code to the first code;
program instructions configured to instruct the ATM to disburse the funds as a result of the second code matching the first code; and
program instructions configured to receive a confirmation of disbursement from the ATM,
wherein the program instructions are stored on the computer readable storage medium for execution by the hardware processor via the computer readable memory.

14. The system according to claim 13, further comprising program instructions to instruct the ATM to receive the second code from the second user by capturing a photo of a device screen of the second user,
wherein the computing device is an ATM other than the ATM, and
the first code is generated after the request is received from the first user.

15. The method according to claim 1, wherein the code is at least one selected from the group consisting of: a numeric code, an alphanumeric code, a barcode, and a quick response (QR) code.

16. The method according to claim 1, further comprising receiving, by the computing device, a telephone number of a mobile telephone of the first user; and
transmitting, by the computing device and to the mobile telephone of the first user, a short message service (SMS) text message that includes the code.

17. The method according to claim 16, wherein the computing device transmits the SMS text message to only the mobile telephone of the first user.

18. The method according to claim 1, further comprising transmitting, by the computing device and to the first user, the code,
wherein the computing device transmits the code to only the first user and the ATM.

19. The system according to claim 13, further comprising program instructions configured to instruct the ATM to not disburse the funds as a result of the first alphanumeric code and the second code being different codes.

20. The system according to claim 13, further comprising program instructions configured to invalidate the first alphanumeric code as a result of receiving the confirmation of disbursement; and
program instructions configured to instruct the ATM to treat the first alphanumeric code as invalid as a result of the invalidation of the first alphanumeric code.

* * * * *